United States Patent
Duchene

(10) Patent No.: US 9,507,846 B2
(45) Date of Patent: Nov. 29, 2016

(54) FACTORIZATION OF SCENARIOS

(71) Applicant: SOMFY SAS, Cluses (FR)

(72) Inventor: Isabelle Duchene, Mariginer (FR)

(73) Assignee: SOMFY SAS, Cluses (FR)

( * ) Notice: Subject to any disclaimer, the term of this patent is extended or adjusted under 35 U.S.C. 154(b) by 189 days.

(21) Appl. No.: 13/711,964

(22) Filed: Dec. 12, 2012

(65) Prior Publication Data
US 2013/0151529 A1 Jun. 13, 2013

(30) Foreign Application Priority Data
Dec. 12, 2011 (FR) ...................................... 11 61498

(51) Int. Cl.
*G06F 17/30* (2006.01)
*G05B 19/10* (2006.01)

(52) U.S. Cl.
CPC ....... *G06F 17/30598* (2013.01); *G05B 19/106* (2013.01)

(58) Field of Classification Search
CPC .............. G06Q 10/10; G06Q 50/06; G06Q 10/06314; G06Q 10/109; H04L 12/2803; H04L 12/2807; H04L 12/282; H04L 41/0803; H04L 43/045; H04L 12/2829; H04L 67/025; H04L 12/1881; G05B 2219/2642; G05B 19/106; G05B 15/02; G06F 17/30598; F24F 11/006; F24F 11/0086; F24F 2011/0091; F24F 2011/0058; F24F 2011/0075; F24F 2011/0068
USPC .......................................................... 707/737
See application file for complete search history.

(56) References Cited

U.S. PATENT DOCUMENTS

| | | | | |
|---|---|---|---|---|
| 5,953,017 A | * | 9/1999 | Beach et al. .................. | 345/440 |
| 6,219,053 B1 | * | 4/2001 | Tachibana ............ | G06F 3/0481 345/440 |
| 2007/0192022 A1 | * | 8/2007 | Lueer ................. | G01C 21/3611 701/532 |
| 2008/0250342 A1 | * | 10/2008 | Clark et al. ................... | 715/771 |
| 2009/0077397 A1 | * | 3/2009 | Shnekendorf ............. | H02J 3/14 713/310 |
| 2009/0164049 A1 | * | 6/2009 | Nibler .................. | G05B 19/106 700/276 |
| 2010/0023865 A1 | * | 1/2010 | Fulker ................. | G06F 3/04817 715/734 |
| 2012/0143378 A1 | * | 6/2012 | Spears .................. | H04L 12/282 700/275 |

FOREIGN PATENT DOCUMENTS

| | | |
|---|---|---|
| EP | 2196877 A1 | 6/2010 |
| FR | 2882843 A1 | 9/2006 |

* cited by examiner

*Primary Examiner* — Evan Aspinwall
(74) *Attorney, Agent, or Firm* — Cantor Colburn LLP

(57) ABSTRACT

A method for configuring a control interface for controlling a system including one or more pieces of home automation equipment, the control interface including an information screen on which may be displayed a time scale representing a time period with a defined duration, the method including steps of: (i): defining a plurality of associations, each association being defined between a scenario for controlling one or more pieces of home automation equipment and a triggering instant defined within the time period, at which the scenario has to be triggered by the control interface, (ii): producing a grouping of at least one portion of the association from among the plurality of defined associations, the triggering instants of which are defined within a time interval with a defined duration within the time period, (iii): positioning a collective reference mark on the time scale corresponding to the grouping at the time interval.

17 Claims, 4 Drawing Sheets

FACTORIZATION OF SCENARIOS

TECHNICAL FIELD

The invention relates to the field of home automation and building automation and, more particularly, to a method for configuring a control interface for controlling a system comprising one or more pieces of home or building automation equipment as well as said control interface.

BRIEF DESCRIPTION OF RELATED ART

With the recent development of smart phones, it is possible to produce a mobile control interface suitable for applying methods for configuring a control interface, so as to easily configure, without any tedious cabling or configuring, groups of electric home or building automation equipment which may be driven together from a central control or remote control unit.

With the development of home automation applications it is now possible to drive a relatively sizeable number of pieces of home equipment, notably shutters, blinds, windows, accesses, lightings and electric appliances, either individually (a group formed with a single piece of equipment), or several pieces of equipment together.

It is also useful to provide particular controls suitable for all sorts of life situations or activities of the occupants of the building such as notably, waking up, going to bed, going on holiday, going out for a few hours, home theater experience or siesta.

These particular controls, often called scenes or scenarios, consist of a set of controls intended for groups of pieces of equipment and cause, when they are executed, the switching of the equipment into configurations recorded beforehand.

Of course, it is interesting to form groups of equipment which correspond to the situation of these pieces of equipment relatively to the building, for example, the whole of the openings or shutters of a frontage, the whole of the pieces of electric equipment of a room, or the different pieces of equipment involved in a scenario.

Once these groups or scenarios are formed, it is then possible to send a common order to the pieces of equipment of each of the groups, or a particular order to each of the pieces of equipment or groups of equipment related to a scenario.

Because of the possibility of creating multiple scenarios and groups, reference marks have to be provided for properly organizing and naming the latter.

The size of a screen of a smart phone is limited and the displayed information is most often with reduced dimensions. This interferes with proper interpretation of the information by the user.

Within the scope of controls for groups of equipment, it is common to allow the user to give names to the different groups in order to easily find them again and optionally for allowing their classification. The solutions of the prior art are for example based on drop-down lists or scrolling menus, showing the names given to the different groups.

The problem related to the scrolling lists or menus is the following: remembering and selecting a piece of equipment should only be accomplished on names (the number of characters of which is sometimes limited); the overall viewing of a complete list of the whole of the pieces of equipment is therefore difficult to produce from a single display on the screen, taking into account the reduced size of the screens of the control interfaces, except by considerably reducing the size of the characters, which makes them illegible. These means for organizing and viewing information are therefore not adapted to the control interfaces having a small size screen.

Moreover, the life or activity situation of the users often implies that a multiplicity of scenarios automatically launched during a reduced time interval should be defined. The association of these scenarios with a triggering instant over a time scale may give the possibility of indicating the instants for triggering these scenarios to the user, but the reference marks corresponding to the association of scenarios with an instant of the time scale are then concentrated in a reduced time interval.

Consequently, the display indicating the triggering of these scenarios may become difficult to interpret by the user.

BRIEF SUMMARY

The invention provides a method of use of a control interface for controlling pieces of home automation equipment giving the possibility of improving the solutions known from the prior art and finding a remedy to the aforementioned drawback.

For this purpose, the invention provides a method for configuring a control interface for controlling a system comprising one or more pieces of home automation equipment, the control interface comprising an information screen on which a time scale may be displayed representing a time period with a defined duration, said method including steps for:

(i): defining a plurality of associations, each association being defined between a scenario for controlling one or more pieces of home automation equipment and a triggering instant comprised within the time period at which the scenario has to be triggered by the control interface, (ii): achieving grouping of at least one portion of the defined associations, the triggering instants of which are comprised in a time interval with a defined duration within the time period, (iii): positioning a collective reference mark on the time scale corresponding to the grouping at the time interval.

These arrangements give the possibility of viewing on a same screen the whole of the scenarios which may be applied during the time interval with a defined duration, comprised within the time period.

According to an embodiment, the method comprises a step for (iv): displaying on a portion of the information screen the associations comprised in the grouping.

According to an embodiment, the associations comprised in the grouping are displayed as one or more singular reference marks corresponding to an association between an operating scenario for one or more pieces of home automation equipment and an instant comprised within the period of time and/or one or more collective reference marks corresponding to a subset of the associations comprised in the grouping.

According to an embodiment, the associations comprised in the grouping are displayed as a list, notably showing for each association an identifier of the scenario and the triggering instant. In particular, this list may be a chronological list.

According to an embodiment of the method, the display step is carried out following action of a user at the control interface.

According to an embodiment of the method, step achieves grouping of the whole of the associations from among the plurality of defined associations, the triggering instants of which are comprised in a time interval with a defined duration within the time period.

According to an embodiment of the method, the step for achieving grouping of at least one portion of the associations is triggered when the number of associations between scenarios and triggering instants comprised in a same time interval is greater than or equal to a predefined number of associations.

According to an embodiment of the method, when the number of associations between scenarios and triggering instants comprised within a same time interval is smaller than the predefined number of associations, it comprises a step for positioning a singular reference mark for each association of said at least one portion of the associations.

According to an embodiment of the invention, during several steps for positioning a singular reference mark for an association from among the plurality of associations defined in step, several singular reference marks are positioned at a same time interval in a shifted way relatively to each other so as to avoid any overlapping.

According to an embodiment of the invention, the representation of the time interval is different depending on whether the number of associations between scenarios and triggering instants comprised within this time interval is less than the predefined number of associations or according to whether the number of associations between scenarios and triggering instants comprised within this time interval is greater than or equal to the predefined number of associations.

According to an embodiment of the invention, the representation of the time interval comprises a portion extending over the time scale within the time interval with defined duration comprised within the time period.

According to an embodiment of the method, the method comprises:
  defining a sunrise instant within the time period,
  defining a sundown instant within the time period.

According to an embodiment of the method, the method comprises periodically adjusting the definition of the sunrise and sundown instants within the time interval from values such as:
  sunrise and sundown instants at the summer and winter solstice of the location in which is found the system comprising the home automation equipment, and/or
  geographical coordinates of the location in which is found the system comprising the home automation equipment, and/or
  of the town in which is found the system comprising the home automation equipment, the latter being selectable from a determined list of towns.

According to an embodiment of the method, the latter comprises steps for:
  representing on the time scale a sunrise instant by a sunrise reference mark,
  representing on the time scale a sundown instant by a sundown reference mark.

The invention is also a control interface for controlling a system comprising pieces of home automation equipment, the control interface comprising:
  means for defining and/or selecting operating scenarios of one or more pieces of home automation equipment, and an information screen,
  said control interface being characterized in that it comprises hardware and/or software means for applying the method as described earlier.

According to an aspect of the invention, the information screen is a touch screen comprising touch control means, the latter being part of the means for defining and/or selecting scenarios for controlling one or more pieces of home automation equipment.

The invention is also an installation comprising a control interface as described earlier and a system comprising home automation equipment.

BRIEF DESCRIPTION OF THE DRAWINGS

Anyway, the invention will be better understood by means of the description which follows, with reference to the appended schematic drawing illustrating as a non-limiting example, a control interface applying the steps of a method according to the invention.

DETAILED DESCRIPTION

Figure 1:
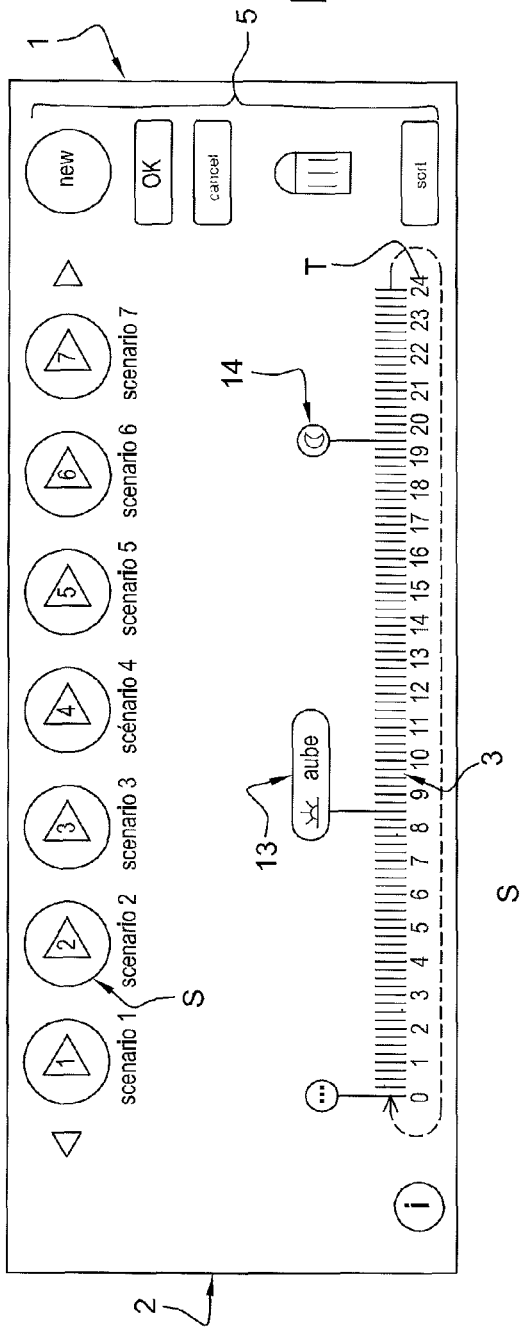
FIG. 1 shows an information screen of a control interface according to the invention with a first display.

As illustrated in FIG. 1, a control interface 1 according to the invention comprises an information screen 2.

At the bottom of this information screen 2, a time scale 3 is illustrated, representing a period of time T of 24 hours corresponding to the duration of a day.

This time scale 3 is linear and includes graduations 4 defining time intervals with a duration $\Delta T$ of fifteen minutes between two graduations 4. The time scale may alternatively be variable, i.e. include graduations at variable distances.

The control interface 1 allows suitable scenarios S to be generated for any kinds of life or activity situations of the occupants of a building such as notably, waking up, going to bed, going on holiday, leaving for a few hours or siesta, these scenarios S being related to groups of equipment.

The triggering of these scenarios S cause switching of the equipment in configurations recorded beforehand.

In order to record these configurations and to create the scenarios S, the control interface 1 has means 5 for generating scenarios S. These means 5 for generating scenarios S are visible on the right of the information screen 2.

As soon as the scenarios S are created, at least one association A (S, t) may be defined between an operating scenario S of one or more pieces of automation equipment and an instant t comprised within a time interval $\Delta T$ of the time period T of the time scale 3.

Figure 2:
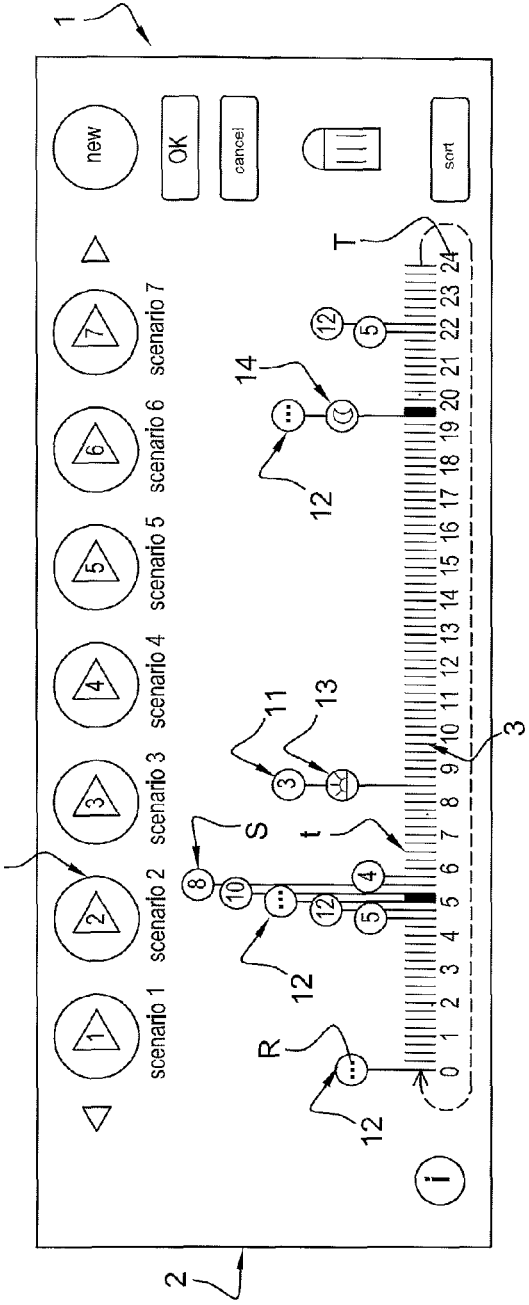
FIG. 2 shows an information screen of a control interface according to the invention with a second display.
Figure 3:
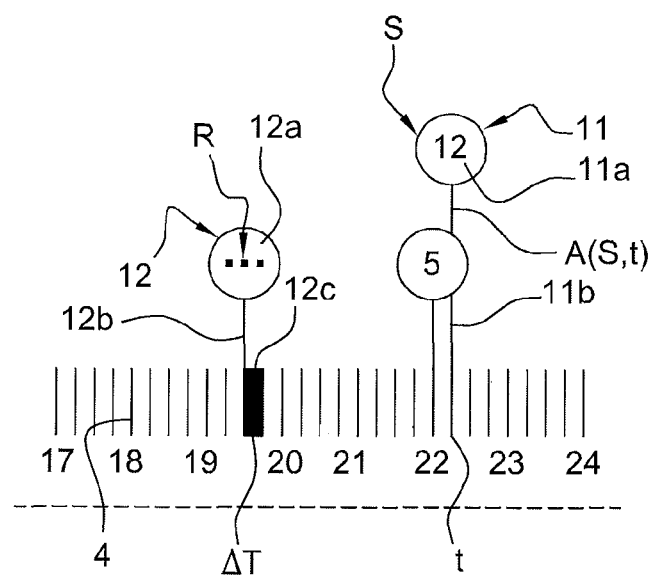
FIG. 3 is an enlarged view of a portion of the information screen illustrated in screen 2.

In the case when the existing associations A between scenarios and instants t are distributed in different time intervals $\Delta T$ over the time period T, then each association A may be illustrated on the time scale 3 as a singular reference mark 11 of a first type placed above the time scale 3, as this is visible in FIGS. 2 and 3.

In the example shown, the singular reference mark 11 comprises a first so-called identification portion 11a formed by a circle in which a symbol is written, for example a number corresponding to the scenario S created by a user, allowing the latter to easily identify the relevant scenario S.

The singular reference mark 11 also comprises a second so-called matching portion 11b formed by a vertical line extending from the identification portion 11a of the reference mark 11 as far as a graduation 4 of the time scale 3, allowing the user to locate on the time scale 3 the instant t for triggering the scenario S identified by the identification portion 11a.

As illustrated in FIG. 2, the definition of the association A between a scenario S and an instant of the period of time T may lead to the placement of several singular reference marks 11 of the first type in a reduced time interval of the time period T.

In FIG. 2, several of these reference marks 11 are placed between 4 and 6 o'clock in the morning.

The identification portions 11a of the reference marks 11 are arranged above each other and the second portions 11b of the reference marks 11 therefore have a variable length so as to be able to represent the first portions 11a in a shifted way, notably without any overlappings and so as not to reduce the legibility of the identifier of a scenario S.

Nevertheless, the space available on the information screen 2 allowing such a display of reference marks 11 is limited.

Thus, in order to be able to preserve the legibility of the screen, the control interface 1 defines a grouping R (A∈ΔT) of a portion from a plurality of associations A (S, t), the triggering instants t of which are comprised in a time interval ΔT with a defined duration comprised within the time period T.

In the example shown, the grouping R comprises the whole of the associations A from among the plurality of defined associations, the triggering instants t of which are comprised in a time interval ΔT with a duration defined within the time period T.

In the embodiment shown, this time interval with a defined duration corresponds to the duration between two graduations 4 of the of the time scale 3, i.e. to a duration equal to fifteen minutes.

Figure 8:
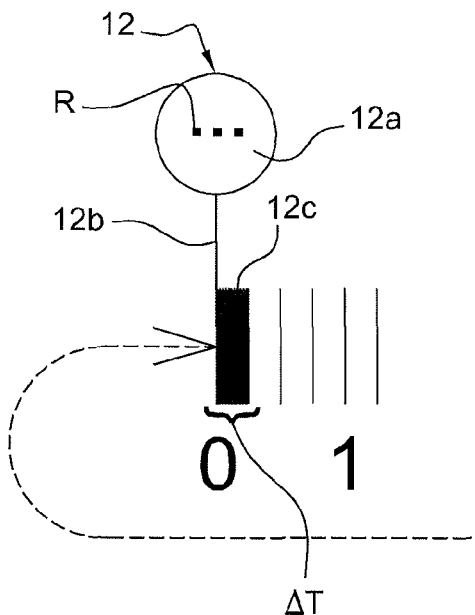
FIG. 8 is an enlarged view of a portion of the information screen illustrated in FIGS. 4 to 6.

The grouping R is illustrated in a third step of the method on the time scale 3 as a collective reference mark 12 of a second type placed above the time scale 3 and more particularly illustrated in FIGS. 3 and 8.

The collective reference mark 12 comprises a first so-called identification portion 12a formed by a circle in which a symbol is written allowing the user to easily identify the grouping of the plurality of associations.

In the example shown, this symbol is formed by three consecutive dots placed horizontally.

Of course, the present invention is not limited to this symbol which may be replaced with any other means allowing differentiation of the collective reference mark 12 from a singular reference mark 11.

The grouping may be achieved manually by a user or automatically, for example when the number of associations over a time interval ΔT exceeds a predefined integer. Conversely, when the number of associations of a grouping becomes less than a predefined number, the collective reference mark is replaced with singular reference marks specific to each association over the time interval ΔT.

As illustrated in FIG. 8, the collective reference mark 12 also comprises a second so-called matching portion 12b formed by a vertical line extending from the identification portion 12a of the reference mark 12 as far as a graduation 4 of the time scale 3, on the one hand, and also comprises a third so-called overlapping portion 12c formed by a surface occupying the time interval ΔT between two graduations 4 of this time scale 3 along the graduation 4 on which extends the second matching portion 12b on the other hand, and allowing the user to locate on the time interval 3, the time interval ΔT during which are triggered the scenarios S grouped under the collective reference mark 12. Like for the singular reference marks 11, the length of the vertical line is variable, so as to shift if necessary the collective reference mark 12 relatively to the other collective or singular reference marks.

In the example shown, the information screen 2 is of the touch screen type and therefore comprises touch control means 6 which belong to means 5 for generating operating scenarios S of one or more pieces of home automation equipment.

FIGS. 4 to 7 show different displays of information screen 2 upon pressing on an area of the information screen 2 in which appears the first portion 12a of a collective reference mark 12.

The touch control means 6 give the possibility of associating a function with the pressing on this area of the information screen 2.

Figure 4:
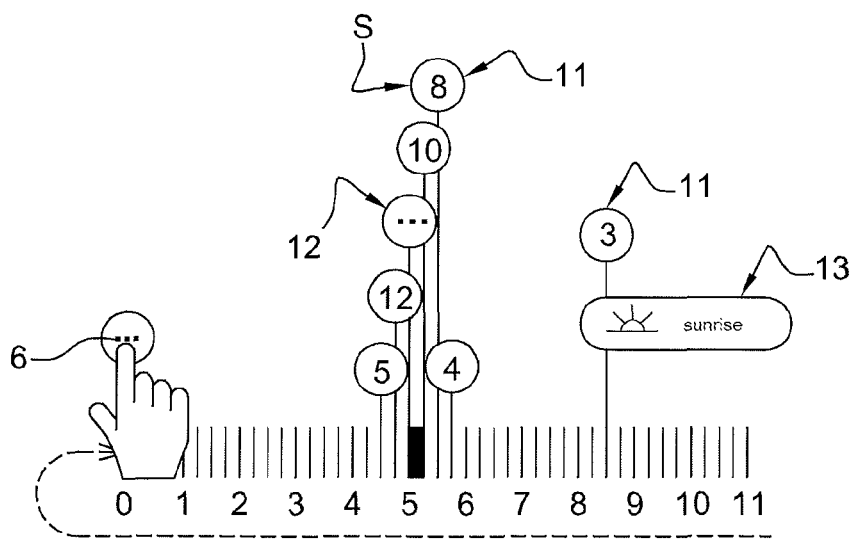
FIGS. 4 to 7 illustrate viewing or configuration steps which may be carried out in a method for using a control interface according to the invention.

This user action is illustrated with a hand in FIG. 4.

Figure 5:
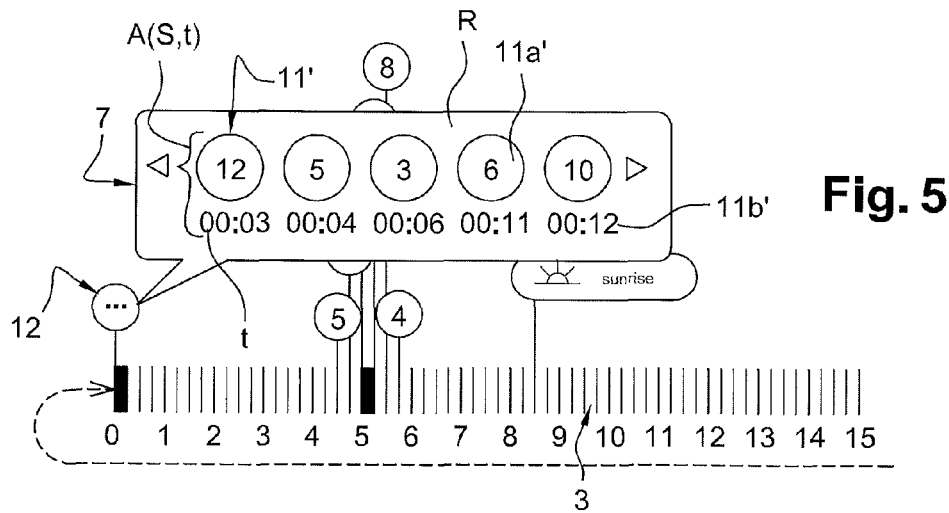

This leads to a fourth step of the method according to the invention, according to which, following interaction with the user, the control interface illustrates said at least one plurality of associations of the grouping with several singular reference marks of the first type shown in FIG. 5.

Figure 9:
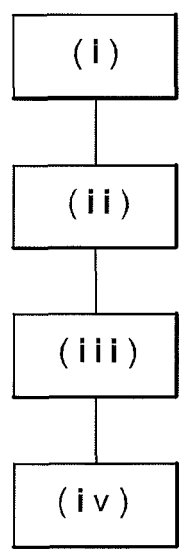
FIG. 9 illustrates a method for use according to the invention.

The four steps, (iii) and are illustrated in FIG. 9.

This illustration may however include collective reference marks 12.

This representation on the information screen 2 is made as a bubble 7 connected to the first portion 12a of the collective reference mark 12 on which the user has pressed.

In this bubble 7, singular reference marks 11' of a second type appear and are chronologically distributed over the width of the bubble 7.

These singular reference marks 11' are a shape alternative of the singular reference marks 11 and differ from the latter only in that they do not include any second portion 11b formed with a vertical line.

The singular reference marks 11' would however be able to be identical with the singular reference marks 11 and be placed on a new time scale illustrated in the bubble 7.

The first portions 11a' of these reference marks 11' are identical with the first portions 11a of the reference marks of the first type 11 formed by a circle in which is written the number corresponding to a scenario S.

The second portion 11b is as for it replaced with a second portion 11b' directly indicating the instant with which a scenario S is associated.

The second portion 11b' appears directly under the first portion 11a' of each reference mark 11' of the bubble 7.

As mentioned above, these singular reference marks 11' are chronologically distributed according to the instants with which a scenario S is associated.

This instant has a value comprised between two graduations 4 of the time scale 3 between which extends the third portion 12c of the reference mark of the second type 12 on which the user has pressed.

In the example shown, this instant is therefore comprised within a duration not exceeding fifteen minutes.

Figure 6:
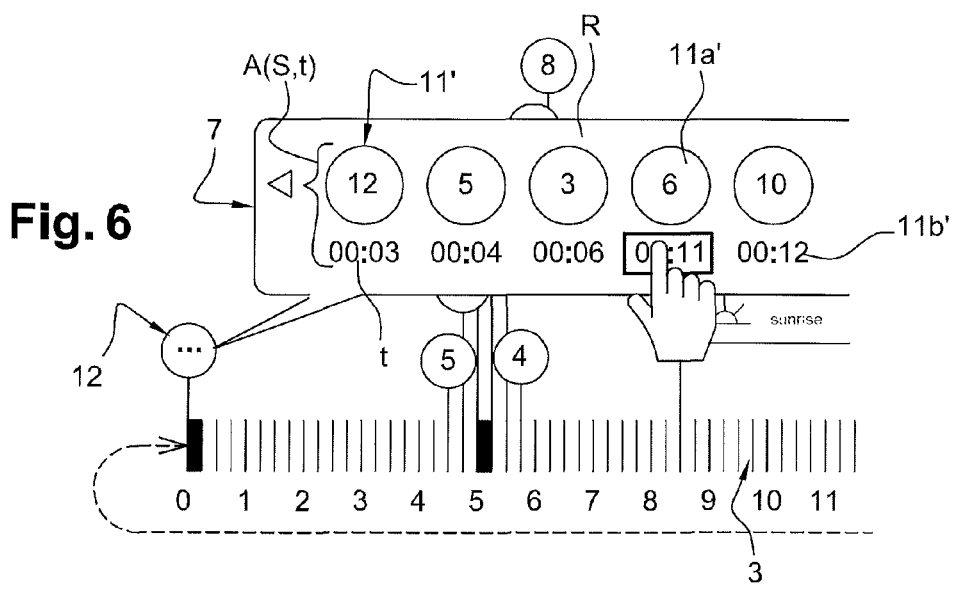
Figure 7:
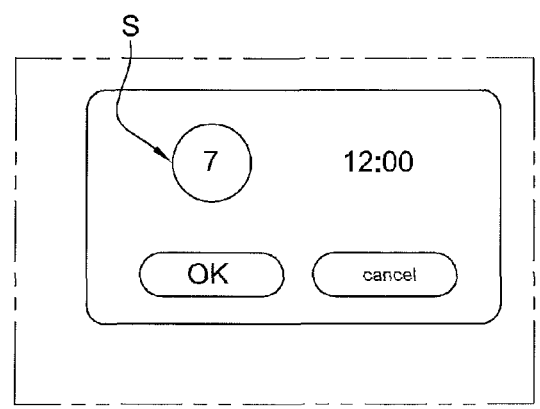

As illustrated in FIGS. 6 and 7, the display of the bubble 7 gives the possibility of displaying, viewing and/or modifying the whole of the associations of the grouping, between the scenarios S and their triggering instants. Notably, an association may be modified, in particular by modifying the triggering instants in the time interval ΔT or else outside this time interval, in which case the association is then excluded because of the grouping.

It is in this way that in FIGS. 6 to 7, the scenario 6 may be suppressed from the whole of the associations forming the grouping R and the scenario 7 may be added to this grouping R by modifying the triggering instants to a value comprised in the time interval ΔT.

In an embodiment of the method, the latter comprises defining a sunrise instant in the time period and as sundown instant in the time period T.

These definitions are performed periodically, i.e. predefined for each day of a calendar year from values such as:
  sunrise and sundown instants at the summer and winter solstice of the location in which is found the system comprising the home automation equipment, and/or
  geographical coordinates of the location in which is found the system comprising the home automation equipment, and/or
  of the town in which is found the system comprising the home automation equipment, the latter being selectable from a list of towns of a database.

For a time scale T corresponding to a given day, a reference mark of the third type 13 corresponding to the sunrise instant and a reference mark of the fourth type 14 corresponding to the sundown instant are positioned at the predefined sunrise instant and sundown instant.

The reference mark of the third type 13 only differs from a singular reference mark 11 in that the number corresponding to the scenario S created by the user is replaced by a pictogram illustrating a sun and optionally completed with text.

Also, the reference mark of the fourth type 14 only differs from a singular reference mark 11 in that the number corresponding to the scenario S created by the user is replaced with a pictogram representing a moon crescent.

These reference marks of the third and fourth type are automatically positioned to the predefined instant corresponding to the calendar day with which the time scale is associated.

Of course, the present invention is not limited to this type of pictogram but on the contrary comprises all the means for differentiation with a singular reference mark 11 and a collective reference mark 12.

The invention also provides the control interface 1 comprising:
  the means 5 for generating operating scenarios S for one or more pieces of home automation equipment, and
  the information screen 2.

Further, the control interface 1 comprises hardware/or software means for applying the method of use as described earlier.

As mentioned above, these hardware means may comprise a touch screen which has the advantage of being able to do without any remote control means of the information screen 2.

The present invention also relates to the installation comprising a control interface 1 as described earlier and to a system comprising home automation equipment, such as actuators of blinds, lighting actuators, locking actuators which may be driven together from a central control or remote control unit.

Although the invention has been described in connection with particular exemplary embodiments, it is quite obvious that it is by no means limited thereto and that it comprises all the technical equivalents of the means described as well as their combinations.

The invention claimed is:

1. A method for configuring a control interface for controlling a system comprising one or more pieces of home automation equipment, the control interface comprising an information screen on which may be displayed a time scale representing a time period of a defined duration, said method including steps of:
  (i): defining a plurality of associations, each association being defined between a scenario for controlling one or more pieces of home automation equipment and a triggering instant comprised within the time period at which the scenario has to be triggered by the control interface;
  (ii): positioning a singular reference mark for each association in the plurality of associations at the triggering instant of said each association;
  (iii): automatically producing a grouping of at least one portion of the defined associations, the triggering instants of which are comprised in a time interval of a defined duration within the time period when the number of associations between scenarios and triggering instants comprised in a same time interval is greater than or equal to a predefined number of associations,
  (iv): positioning a collective reference mark on a time scale corresponding to the grouping of associations at the time interval corresponding to the triggering moments of these associations, the collective mark replacing the singular reference marks of the grouped associations.

2. The method according to claim 1, further comprising a step of:
  (v): displaying on a portion of the information screen the associations comprised in a temporal grouping.

3. The method according to claim 2, wherein the associations comprised in the grouping are displayed as one or more singular reference marks corresponding to an association between a scenario for operating one or more pieces of home automation equipment and an instant comprised in the time period and/or one or more collective reference marks corresponding to a subset of associations comprised in the grouping.

4. The method according to claim 2, wherein the associations comprised in the grouping are displayed as a list, notably showing for each association an identifier of the scenario and the triggering instant.

5. The method according to claim 2, wherein the display step (iv) is carried out following user action at the control interface.

6. The method according to claim 1, wherein the step (ii) performs a grouping of the whole of the associations from among the plurality of defined associations, the triggering instants of which are comprised in a time interval with a duration defined within the time period.

7. The method according to claim 1, wherein, during several steps for positioning a singular reference mark for one association from among the plurality of the associations defined in step (i), several singular reference marks are positioned at a same time interval in a shifted way relatively to each other in order to avoid overlapping.

8. The method according to claim 1, wherein the representation of the time interval is different depending on whether the number of associations between scenarios and triggering instants comprised in this time interval is less than the predefined number of associations or according to whether the number of associations between scenarios and triggering instants comprised in this time interval is greater than or equal to the predefined number of associations.

9. The method according to claim 8, wherein the representation of the time interval comprises a portion extending on the time scale in the time interval with a defined duration comprised within the time interval.

10. The method according to claim 1, comprising the steps of:
defining a sunrise instant in the time period,
defining a sundown instant in the period of time.

11. The method according to claim 10, including a step consisting of periodically adjusting the definition of the sunrise and sundown instants in the period of time from values:
sunrise and sundown instants at the summer and winter solstice of the location in which is found the system comprising the home automation equipment, and/or
geographical coordinates of the location in which is found the system comprising home automation equipment, and/or
of the town in which is found the system comprising the home automation equipment, the latter being selectable from a determined list of towns.

12. A control interface for controlling a system comprising pieces of home automation equipment, the control interface comprising an information screen and being configured for defining and/or selecting scenarios for operating one or more pieces of home automation equipment, and,
for applying the control method according to claim 1.

13. The control interface according to claim 12, comprising a database for storing data relating to:
the sunrise and sundown instants at the summer and winter solstice of the location in which is found the system comprising home automation equipment, and/or
geographic co-ordinates of the location in which is found the system comprising the home automation equipment, and/or
the town in which is found the system comprising pieces of home automation equipment, the latter being selectable from a determined list of towns,
wherein the step (ii) for producing a grouping of said at least one portion of the associations of the method for configuring a control interface is triggered when the number of associations between scenarios and triggering instants comprised in a same time interval is greater than or equal to a predefined number of associations,
wherein, when the number of associations between scenarios and triggering instants comprised in a same time interval is less than the predefined number of associations, it comprises a step for positioning a singular reference mark for each association of said at least one portion of the associations,
wherein the representation of the time interval is different depending on whether the number of associations between scenarios and triggering instants comprised in this time interval is less than the predefined number of associations or according to whether the number of associations between scenarios and triggering instants comprised in this time interval is greater than or equal to the predefined number of associations.

14. The control interface according to claim 12, wherein the information screen is a touch screen arranged for defining and/or selecting scenarios for operating one or more pieces of home automation equipment.

15. The installation comprising a control interface according to claim 12 and a system comprising home automation equipment.

16. The method according to claim 1, comprising a step of:
(v): displaying the time scale with at least one collective reference mark corresponding to the grouping of the at least one portion of the defined associations and at least one singular reference mark corresponding to at least one association not included in the grouping.

17. A method for configuring a control interface for controlling a system comprising one or more pieces of home automation equipment, the control interface comprising an information screen on which may be displayed a time scale representing a time period of a defined duration, said method including steps for:
(i): defining a plurality of associations, each association being defined between a scenario for controlling one or more pieces of home automation equipment and a triggering instant comprised within the time period at which the scenario has to be triggered by the control interface,
(ii): positioning a singular reference mark for each association in the plurality of associations at the triggering instant of said each association if the number of associations between scenarios and triggering instants comprised in a same time interval is less than a predefined number of associations, or
(iii): Automatically producing a grouping of at least one portion of the defined associations, the triggering instants of which are comprised in a time interval of a defined duration within the time period if the number of associations between scenarios and triggering instants comprised in a same time interval is greater than or equal to a predefined number of associations,
(iv): positioning a collective reference mark on a time scale corresponding to the grouping of associations at the time interval corresponding to the triggering moments of these associations, the collective mark replacing the singular reference marks of the grouped associations.

* * * * *